United States Patent [19]

Ferrin

[11] 4,075,102
[45] Feb. 21, 1978

[54] LIQUID PROCESSING MEDIA BED DRAIN SYSTEM

[75] Inventor: Charles Robert Ferrin, Tulsa, Okla.

[73] Assignee: Combustion Engineering, Inc., Windsor, Conn.

[21] Appl. No.: 685,955

[22] Filed: May 13, 1976

[51] Int. Cl.² .............................................. B01D 29/42
[52] U.S. Cl. .................................... 210/277; 210/290; 210/291
[58] Field of Search ................ 210/266, 275, 277, 278, 210/279, 290, 291

[56] References Cited

U.S. PATENT DOCUMENTS

| | | | |
|---|---|---|---|
| 2,723,761 | 11/1955 | Van der Made et al. | 210/285 X |
| 3,240,699 | 3/1966 | Duff et al. | 210/275 X |
| 3,335,868 | 8/1967 | Schiffers | 210/290 X |
| 3,382,169 | 5/1968 | Thompson | 210/290 X |
| 3,617,558 | 11/1971 | Jones | 210/290 X |
| 3,680,701 | 8/1972 | Holca | 210/275 X |

Primary Examiner—Morris O. Wolk
Assistant Examiner—Arnold Turk
Attorney, Agent, or Firm—Arthur L. Wade

[57] ABSTRACT

A bed of granular media is supported in a vessel to process liquid flowed in through both the upper and lower faces of the bed and out of the bed at a location intermediate the upper and lower faces. A drain structure for the processed liquid is mounted at the location intermediate the two bed faces with the capacity to withdraw the quantity of liquid flowing into both of the bed faces. A closed circuit is provided to transfer residual material in the drain structure back to the inlet system of the bed after backwash of the bed. A holding vessel is connected to the vessel in which the media bed is supported to temporarily receive the media for service periods of the bed vessel.

5 Claims, 7 Drawing Figures

LIQUID PROCESSING MEDIA BED DRAIN SYSTEM

BACKGROUND OF THE INVENTION

1. Field of the Invention

The present invention relates to fluid drain structure located at a position intermediate the ends of a bed of media through which the fluid is passed vertically in being processed by the media. More particularly, the invention relates to the configuration provided the drain structure which will enable it to survive vertical bed movement, to a cleaning circuit for the drain structure and to a transfer system for the media of the bed to and from the vessel.

2. Description of the Prior Art

Beds of granular media placed inside vessels for fluids to be passed through the media have been common in the art for sometime. Most of these beds of media are used as more or less simple filters to remove undesirable material from the fluid. However, there is a wide range of materials which must be separated from streams of industrial fluid and there are many different materials useful as bed media for this processing.

The art was initially concerned with the relatively simple function of distributing the fluid to be filtered over the horizontal surface of the bed of media and the drain of the filtered liquid from the opposite horizontal surface. The distribution and drain structure were essentially plates with spaced apertures or porous bodies. These perforated plates and porous bodies were usually placed to span their vessel containing the media and placed at the face of the media bed within the vessel.

In broadly describing the structure which retains, or supports, media beds, it is recognized that fluids processed can be directed horizontally, as well as vertically, through the beds. In this prior art, consider primarily the vertical orientation. It is in the vertical flow pattern that a recent revolution has occurred.

Up-flow of processed fluids through media beds turned the porous underdrain structure supporting the beds into a distribution system. At least one example of this system is disclosed in U.S. Pat. No. 2,723,761, dated Nov. 15, 1955 to Van Der Made, et al. The advantages of this up-flow pattern have been established by the practice in the art which follows this disclosed system.

The drain system of the Van Der Made, et al. disclosure was embodied in a porous structure embedded below the upper surface of the media bed. The forces of up-flow on the bed were balanced by the downward pressure of liquid in the freeboard space above the bed. During the backwash cycle, this downward pressure was relieved to permit the bed to be expanded into the freeboard space.

The forces placed upon the drain structure in the vertical upflow bed have not concerned the prior art. Now a new concept has appeared and has been reduced to practice, and the forces placed upon drain structure mounted intermediate the upper and lower faces of the bed of media have proved to be destructive and the source of a very severe problem.

The new concept is disclosed in U.S. patent application Ser. No. 615,670 filed Sept. 22, 1975 by Charles R. Ferrin. In the system disclosed, a multi-media bed of granular material is placed in a vertical orientation. Carefully selected, the media has been graded coarse-to-fine in both the up-flow direction and the down-flow direction. Thus the coarse-to-fine grading made possible by the up-flow pattern has been made available in both directions in the same bed and within the same vessel. The advantages apparent in processing fluid by flowing it into both ends of the same bed and draining the processed fluid from a location intermediate the upper and lower surfaces of the bed were confirmed in the first test of the actual reduction to practice. All subsequent test data has been consistent.

The reduction to practice exposed the mechanical problem of mounting a drain structure at the intermediate location between the two vertical bed faces. The drain system disclosed in the Ferrin patent application was reduced to practice in the first model. The openings in the walls of the vessel conducted processing fluid from the outer edge of the bed. However, it become evident that the processed fluid should be drained from points across the horizontal area of the bed. Additionally, a significant quantity of debris found its way into the drain system during backwash of the bed. Also, the bed media necessary to obtain the coarse-to-fine grading in both directions proved expensive. There is a handling and storage problem of this valuable media during service periods.

SUMMARY OF THE INVENTION

A principal object of the invention is to provide a drain structure intermediate the upper and lower faces of a bed of media with the capacity to combine and conduct processed liquid flowing from both the upper and lower faces of the bed to points across the horizontal cross-section of the bed.

Another object is to provide drain structure with a profile which will obviate the development of vertical forces by the bed media on the structure great enough to destroy and/or displace the drain structure.

Another object is to provide a circuit which will purge debris from the drain structure and return it to the bed media.

Another object is to provide storage for bed media, including transport of the media from the bed location, during periods of service to the bed support.

The present invention is embodied in a support structure for a bed of fluid processing media and a drain structure extended across the horizontal cross-section of the bed intermediate the upper and lower faces of the bed through both of which fluid is passed to be processed. The drain structure is formed with a plan profile substantially smaller than the profile in elevation. Further, the sides of the drain structure are provided with openings into a hollow interior of the drain structure having a total area large enough to receive processed fluid from both upper and lower bed faces.

The invention is also embodied in a circuit which includes a conduit from the drain structure to an inlet to the bed through which debris deposited in the drain system during operations, such as backwash, is returned to the bed.

The invention also contemplates a storage vessel connected to the bed vessel with means to transfer the media of the bed between the two vessels in order to remove the media from the bed vessel during periods of service to the bed vessel.

Other objects, advantages and features of this invention will become apparent to one skilled in the art upon consideration of the written specification, appended claims, and attached drawings, wherein;

DESCRIPTION OF THE PREFERRED EMBODIMENT

NOVEL FLOW PATTERN

No one, to my knowledge, has provided a flow pattern for liquid to be processed, relative to a media bed, in which the liquid is flowed into the opposite ends of the bed to an intermediate take-off point. The prior art does disclose drain structures for processed fluid mounted below the surface of a media bed with an up-flow pattern. These structures are comparable, to some extent, with the drain system for the ends-flow media bed. However, the ends-flow pattern requires the drain structure to be positioned between the coarse-to-fine bed stratification from both above and below the removal point. This position, during the complete cycle of bed operation, is the location of mechanical stress and capacity requirements unknown to the up-flow, and other, patterns.

GENERAL STRUCTURAL DISCLOSURE

Figure 1:
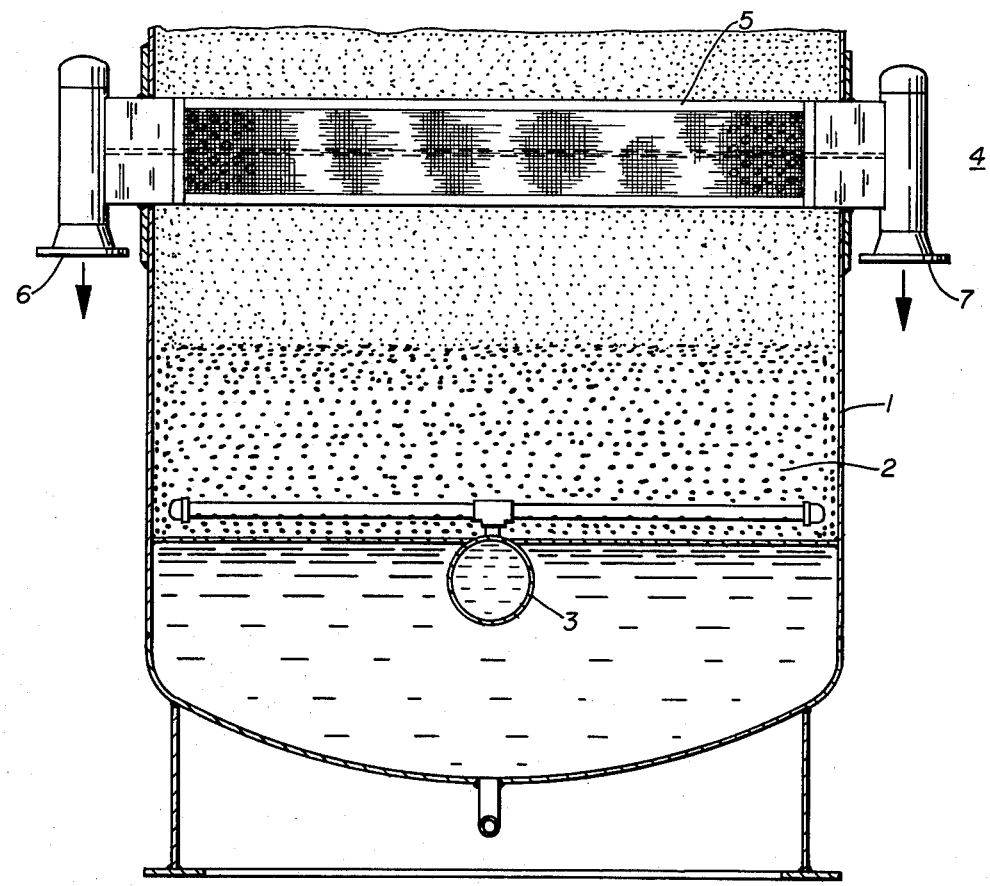
FIG. 1 is a sectioned elevation of the lower portion of a vessel with a portion of the drain system in which the invention is embodied.

The drawing required to disclose this class of invention may be diagrammatic without extensive detail. In FIG. 1 portion of container 1 is shown as indicating a vertically extended vessel. A bed 2 is supported within container 1. Conduits are connected into container 1 to form inlet and outlet means for the liquids. This drawing lacks many details but adequately teaches the invention.

The cylindrical form for container 1 is usually preferred for its ready fabrication and transport. An inlet is provided for each end of the container. Only inlet 3 is shown through the bottom end of container 1. The liquids, entering the container 1 through the two inlets, are processed by bed 2 and discharged through the drain system 4.

When the ends-flow pattern was first reduced to practice, a drain structure was arranged external of the container shell. Openings were formed in the shell, a screen placed over the openings and a compartment built around the outside of the shell to receive the procesed liquid flowing from the shell openings and through their screens. At first, this arrangement appeared ideal. There was no exit structure extending lateraly into the bed. When the bed was vertically expanded, the bed movement had no lateral structure upon which to exert forces. The bed of media could move up and down as a reciprocating piston within the cylindrical shell without obstruction. Finally, it was believed there were fabrication advantages in this arrangement.

There were some advantages to the manifolded, screened shell openings. However, actual experience disclosed some drawbacks which required further invention. First, shell openings of the size required for capacity weakened the shell. Of course the shell could be rolled of thicker plate, but this sent the cost up very sharply. Secondly, the coating required for the manifold mounted on the outside of the shell was very difficult to apply. Coating problems always appear simple, but this one was very difficult to solve economically. Finally, it became evident that the processed liquid was not being drawn from the bed in a satisfactory distribution pattern. Some form of structure would have to be laterally inserted into the bed to establish drain positions over its horizontal cross-section.

Invention is embodied in the cells 5 which are mounted to extend horizontally across the container 1 and the bed 2 supported within the container. These cells have porous walls, the processed liquid flowing from the bed 2 and into the cells. The porosity is established by screens which are provided with a mesh which will retain the bed material in place while allowing passage of the processed liquid into the cell and out the ends 6 and 7. Finally, the cell provides a horizontal profile to the vertical which will be an acceptable minimum of obstruction to the bed as the bed moves vertically in the container.

Figure 2:
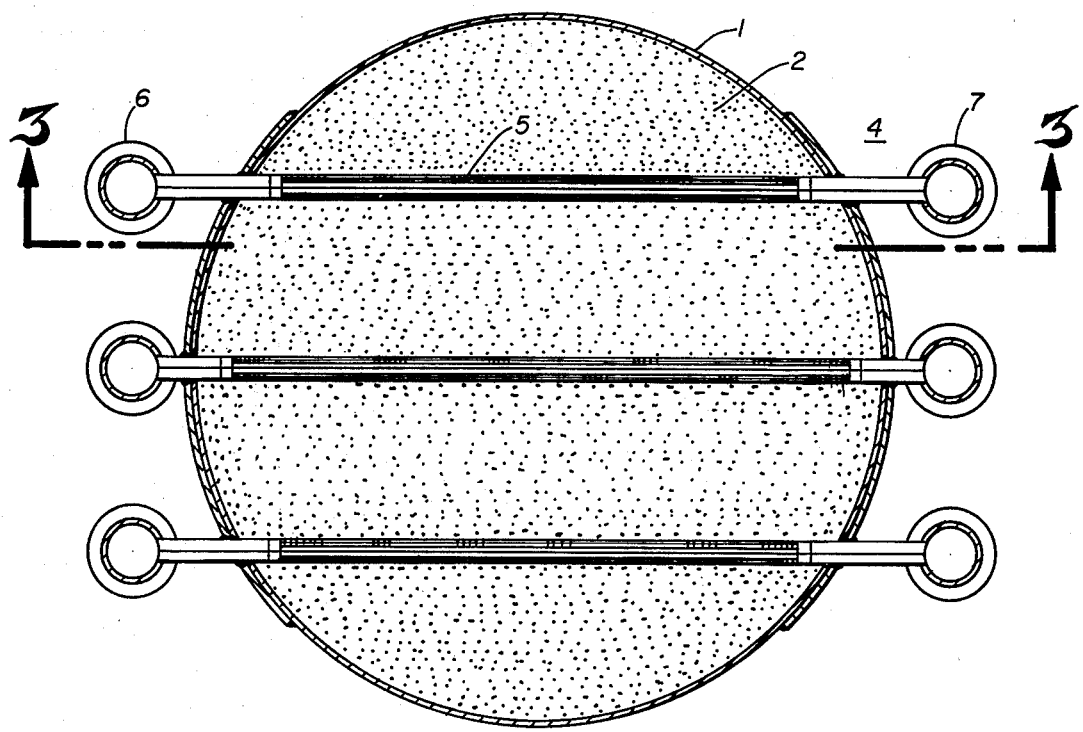
FIG. 2 is a sectioned plan view of the vessel of FIG. 1 with the more complete drain system mounted across the horizontal cross-section.

FIG. 2 discloses the vessel 1 in a sectioned plan view with three of the cells 5 extended horizontally across the bed 2. The holes of each cell wall establish the drain points over the cross-section of the bed which provide a satisfactory withdrawal pattern for the processed liquid.

Although not shown in FIGS. 1 and 2, the ends of cells 5 are to be manifolded together to form a single outlet for the processed fluid flowing from the cells. This is a plumbing detail whose complete disclosure would only tend to obscure the invention.

Figure 3:
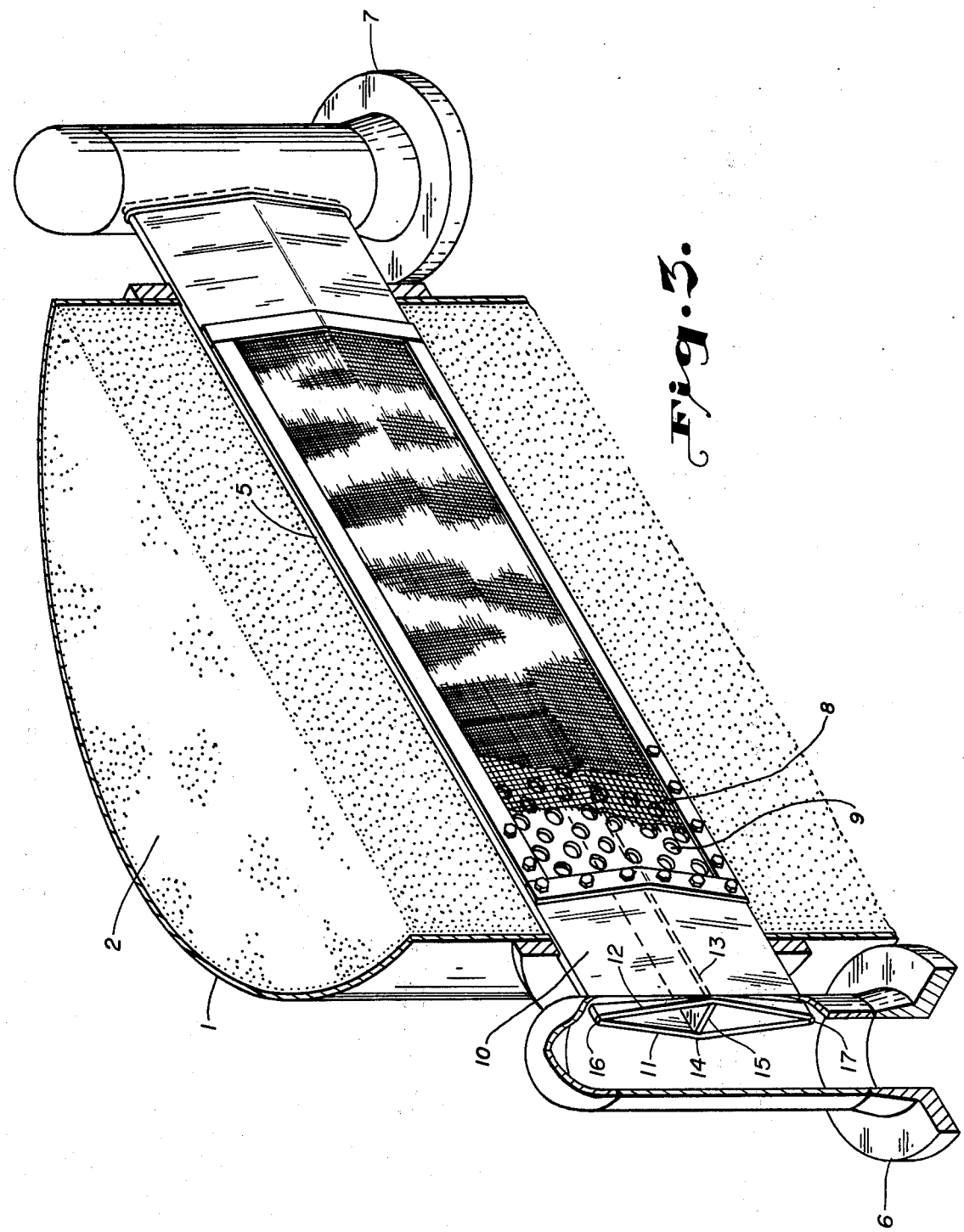
FIG. 3 is a sectioned perspective of the vessel and drain system of FIG. 1.

FIG. 3 discloses the cell 5 of FIG. 1 in the detail peculiar to a perspective. Vessel wall 1 and bed 2 are shown as in FIG. 1. However, the receiver at outlet end 6 is sectioned to disclose its connection to cell 5, and the screen 8 is broken away for a clear view of holes, or perforations, 9 over the vertical surface of side 10 of cell 5.

By now, from this disclosure, the overall problem of draining and the general structure to implement it should be clear. It is necessary that the drain structure be inserted into bed 2. Cell 5 is arranged for this insertion. The processed liquid flowing to the inserted drain structure from above and below must enter the cell 5 through multiple holes 9 in its walls. Screen 8 is mounted over holes 9 to provide a mesh which will prevent the media particles from passing through holes 9 and into cell 5.

Materials

In general, it is expected to roll the shell of vessel 1 from steel. This material may require a coating to prevent corrosion from some of the fluids passed through the bed for processing.

Other metallic material may be desired for the body of cell 5. The actual reduction to practice in field tests used relatively thin stainless steel sheets 11 and 12 formed and assembled as disclosed in FIG. 3.

The sheets 11 and 12 were bent at 13 and 14, along their lengths and bracing strip 15 inserted between the two sheets. The sheets were then welded at 16 and 17, along their lengths, to complete the cell chamber into which the processed fluid is received through holes 9.

The screen 8 is formed of plastic because metallic screen fine enough to function would have no corrosion allowance. There are plastic materials suitable for this service. Screen 8 of this material is effectively clamped into place over holes 9 by metallic strips as shown in FIG. 3.

Horizontal Vessels

From the beginning, the disclosure has emphasized the fluid to be processed has passed vertically through the media bed. FIG. 1, 2 and 3 have disclosed the vessel supporting the bed as vertically extended. In a complete sense the vessel is a cylinder with its axis vertically extended.

There are certain advantages to extending large oil field vessels vertically. There are other advantages to extending the vessels horizontally. The cylinder is generally the easier form to fabricate, but its horizontal extension has the other advantages. No present purpose is served with a systemmatic comparison between the horizontal and vertical orientation of cylindrical vessels. I seek only to avoid narrowing the invention by disclosing it embodied in only a vertical vessel.

Figure 4:
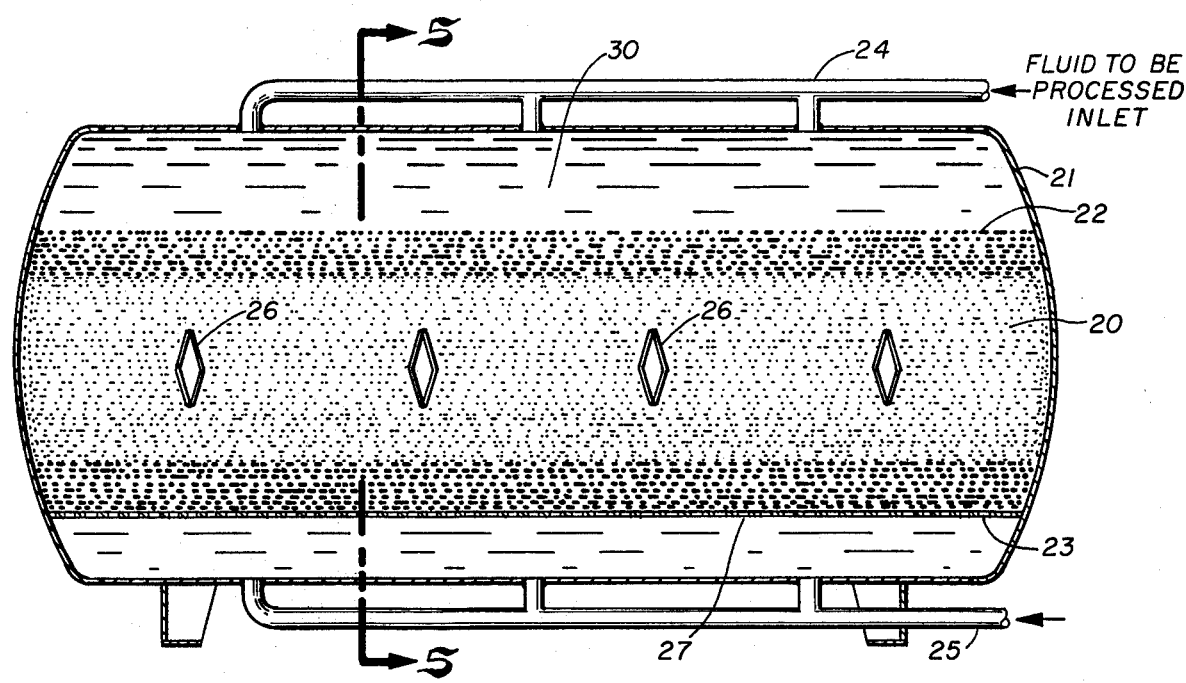
FIG. 4 is a sectioned perspective of a vessel horizontally extended and supporting vertical media beds in which a drain system is mounted in which the invention is embodied.
Figure 5:
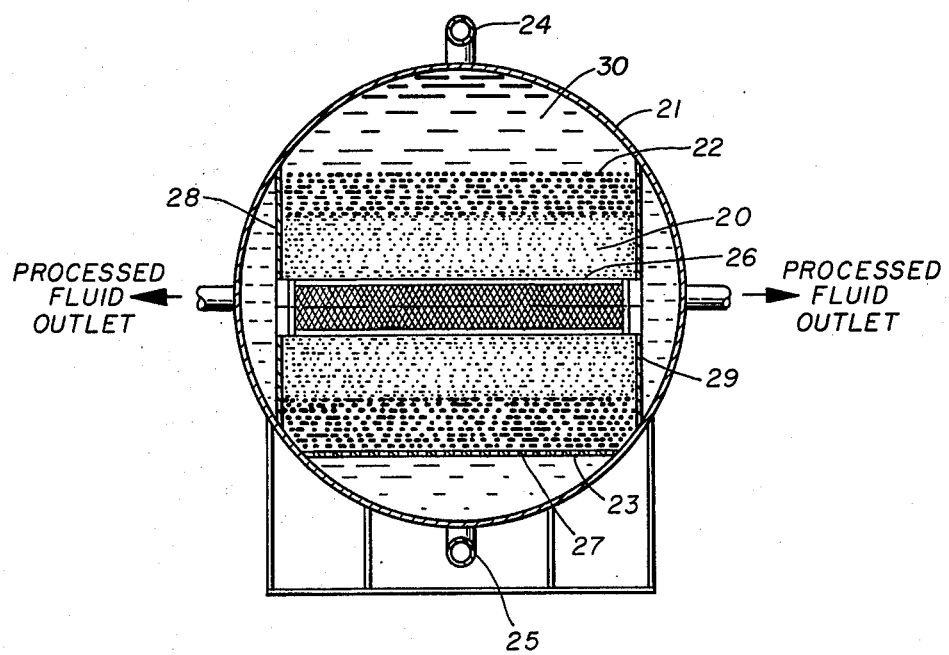
FIG. 5 is an end view of the vessel of FIG. 4 in elevation and sectioned along lines 5—5.

Referring specifically to FIGS. 4 and 5, fluid processing media bed 20 is shown as supported within cylindrical shell 21 which is horizontally extended. Thus is disclosed a bed with upper face 22 and lower face 23 yet supported in a horizontal vessel.

Fluid to be processed is flowed into bed 20 through its faces 22 and 23 with conduits 24 and 25. The processed fluid is flowed from the bed 20 at points intermediate its faces. Specifically, drain systems 26 are mounted between bed faces 22 and 23 to form the conduit for the processed fluid from the bed.

In further detail, bed 20 is supported by perforated plate 27. Side plates 28 and 29 are vertically extended long the inside of shell 21. This arrangement of plates is most clear with the end view provided by FIG. 5. These three plates, with the upper part of the cylindrical shell, form a chamber in which the bed 20 is placed with sufficient freeboard volume 30 for expansion of the bed 20 during the backwash cycle.

This is enough disclosure to place emphasis upon the fact that the invention is embodied in structure which includes a horizontally extended vessel for the bed of granular media. The bed is entered from above and below, at the same time. The drain system is between the two faces of the bed. The drain system is the same as disclosed in FIGS. 1, 2 and 3. However, the cells are mounted between side plates 28 and 29. The volumes between these plates 28 and 29 and the interior sides of the whell 21 form manifolds into which the cells 26 empty the processed fluid drained from the bed 20. The bed functions, and its drain system functions, exactly as disclosed in the vertical vessel of FIGS. 1, 2 and 3. However, the bed in supported in a horizontal vessel. The invention is embodied in both units, regardless of the orientation of the vessels in the units.

BACKWASH AND RINSE

Figure 6:
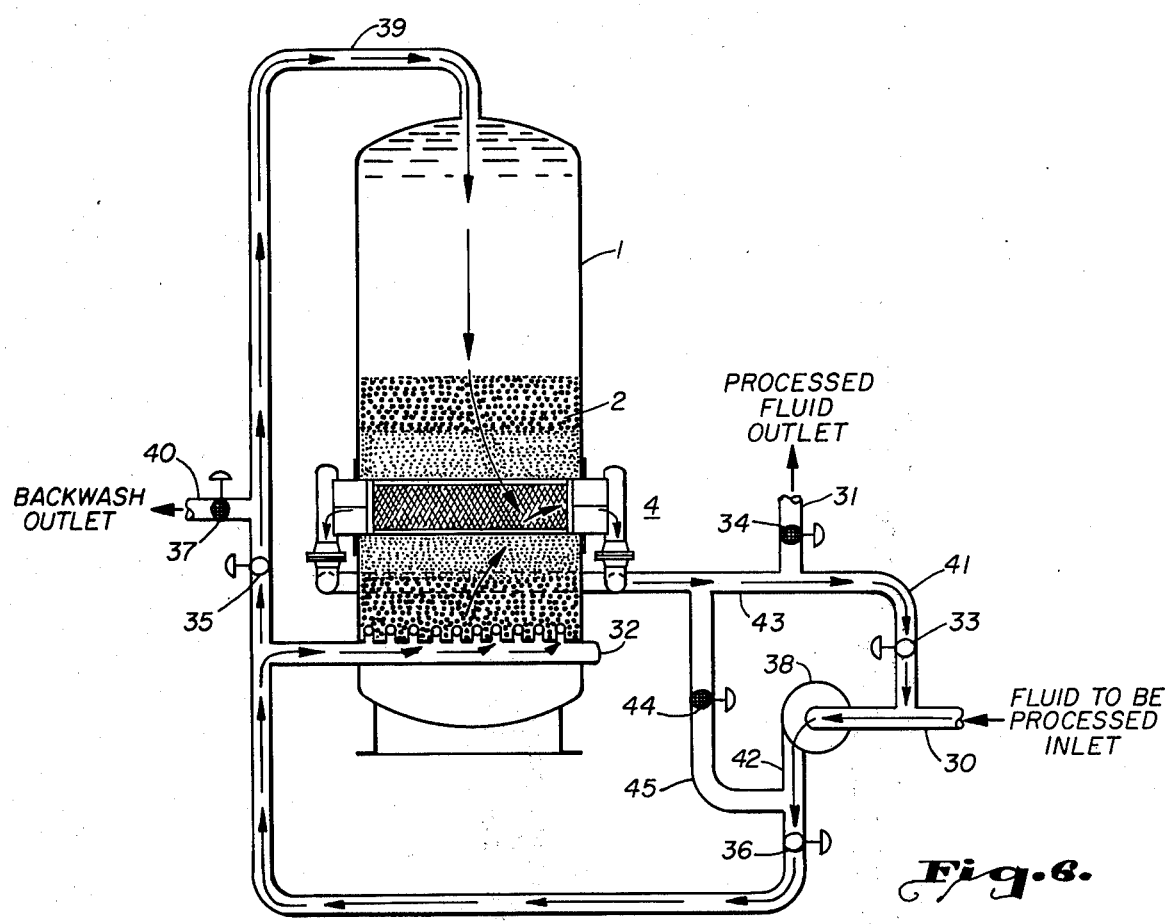
FIG. 6 is a schematic elevation of the external fluid circuit connected to the vessel of FIG. 1.

To those skilled in this art, the flow of backwash liquids in the disclosed unit is not complex. FIG. 6 is adequate to understand the flow pattern for the complete operation of the unit of FIG. 1. The fluid which is to be processed by passing through bed 2 is conducted into the system through conduit 30. The fluid processed is passed from bed 2, and out of the system through conduit 31.

The backwash of bed 2 requires fluid to be passed upward in shell 1, from a fluid distributing system at 32. It will be apparent that if valves 33, 34, and 35 are closed and valves 36 and 37 are open, pump 38 will force fluid from inlet 30 up through distributor 32 and expand bed 2 upward in shell 1. The fluid pumped will agitate the bed 2 media in the classic backwash action and flow from the top of shell 1 through conduit 39 and out conduit 40.

There are many problems of backwash. It is not a purpose of this description to discuss all of these problems. The principal problem solved is that of providing the drain system 4 with a configuration which will enable it to withstand the mechanical stress of the shifting bed 2 media. One of the secondary problems is the collection of debris within the cells 5 of the system during backwash. FIG. 6 is established to specifically disclose how this material can be rinsed back to the surfaces of bed 2 so it will not appear in the outlet 31 when normal processing it resumed.

The basic answer to this debris problem in cells 5 is conduit 41 and valve 33. Valve 33 is normally closed for both passing fluid to be processed out conduit 31 and passing backwashing fluid out conduit 40. This can readily be understood from inspection of FIG. 6. Then, closing valve 34 and valve 37 while valve 33 is open, all as indicated in FIG. 6, forms a closed circuit in which pump 38 circulates the fluid from the drain system 4 back to the faces of bed 2. This circulation of fluid is properly called a rinse cycle in that it flushes the material from drain system 4 to conduit 41 from which it is returned by pump 38 to the two faces of bed 2.

This phase of the operation of the system does not take long. The actual reduction to practice, in its field tests, required only about fifteen minutes for the entire backwash cycle to take place. Only the last fifteen seconds or so of this backwash cycle were taken up with this so-called rinse phase of the cycle.

It may be considered that the amount of debris actually remaining in the cells as a contaminating threat to the output is quite small and of little consequence. This may be true in some applications of the system. However, there are also many uses of the unit which require a consistent, high-quality output of processed fluid. It is in those instances that the rinses phase of the backwash cycle must solve the problem and cycle the contaminating material back to the bed faces.

There is one other residual problem with the cells 5 which may become more critical as time goes on. The screens 8 of the cells have a mesh size which is selected to provide the porosity required for treated fluid discharge from the bed and yet retain the granules of the bed in place. Of course, the differential pressure across the bed, from the face to the outlet screen, is enough to jam some granules into the holes of the screen. Eventually, large numbers of the screen holes can become partially, or completely, blocked by bed material.

The vertical movement of the bed as it expands during backwash will scrub many of these bed granules from where they have lodged in the holes of the screen. This may be an effective cleaning of the screen which is an inherent function of the structure. On the other hand, certain sized granules may not readily dislodge from the screens. If this condition deveops, cummulative blocking of the screens may take place. The differential pressure will then build up and not be reversible.

It is possible that a conduit downstream of pump 38 to the outlet conduit of drain section 4 will be in demand. Specifically, a valved conduit connecting conduit section 42 and conduit section 43 would embody this concept. With valves 34 and 36 closed, valve 37 open, and pump 38 running, the valve 44 in the conduit 45 could regulate back pressure on the screens of drain section 4. This fluid pressure could be applied periodically to dislodge bed media particles and force them back into the bed 2. The program for this screen-cleaning backwash is readily determined. It could even be made a part of every backwash cycle, not requiring more than a brief minute or so on the end of the complete backwash cycle.

The backwash program for the unit of FIG. 6 has many problems. In some locations, and under some requirements, processed fluid may be required for backwashing the bed. In other locations, the inlet fluid may be effectively used to clean the bed and ready it for service. In this disclosure, the shape and structure of the cells 5 have been set by the conception of the invention to give a tolerable obstruction to the bed movement. The debris has been rinsed from the cells 5 and a way of thoroughly cleaning the screens has been disclosed. These are significant improvements in this art and have been reduced to practice and field tested.

Transfer Vessel

During the manufacture and field testing of models and fieldsized reductions to practice of the units of FIGS. 1, 2 and 3 it became evident that all media beds presented a physical installation, removal and storage problem. Whatever specific material is used for the bed, it has a massive handling problem. Further, the media materials, such as garnet, are quite expensive. An operator does not want to risk loss of this material if it becomes desirable to remove it to service, repair or replace structure within the vessel.

Figure 7:
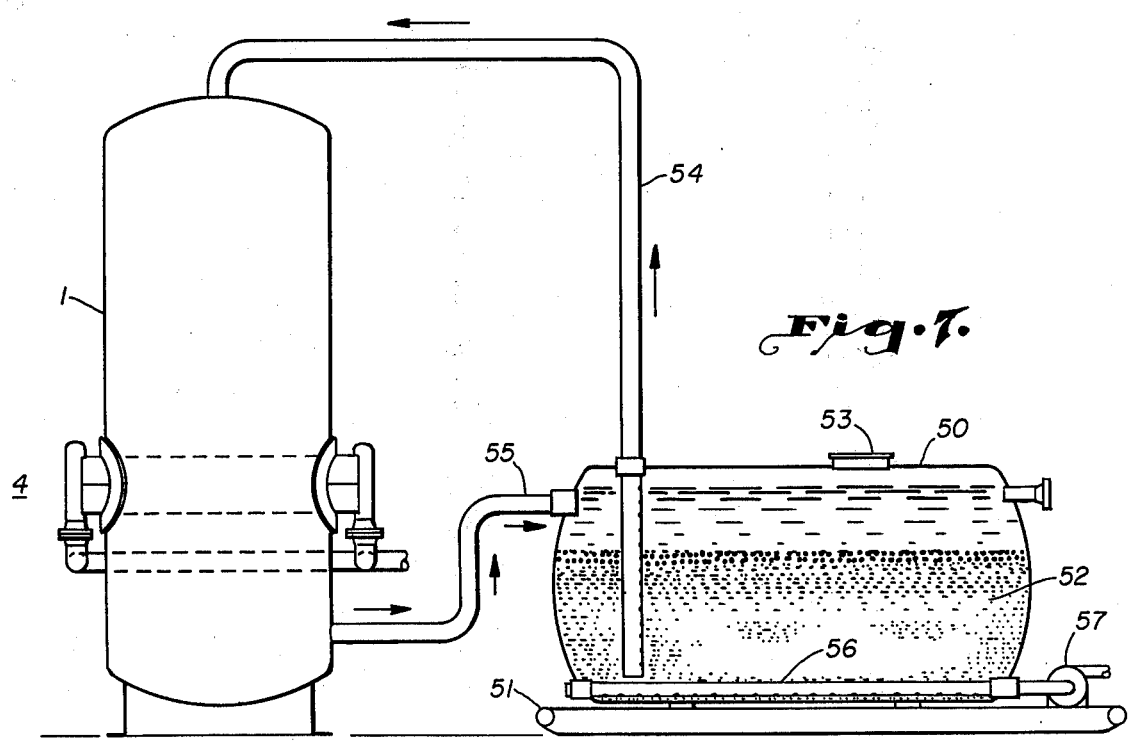
FIG. 7 is an elevation of the media bed vessel of FIG. 1 connected to a storage and transfer vessel.

FIG. 7 discloses a transfer system for the bed media which meets these problems outlined above. Vertical vessel 1 is again shown with the drain system 4. Additionally, vessel 50 is shown, mounted on skid 51, near vessel 1. Bed material 52 is placed in vessel 50 through an access opening 53. This bed material will be transferred to vessel 1 and returned to vessel 50 as desired.

Of course there is much plumbing connected to vessel 1. Some of it is disclosed with FIG. 6. It appears that all that it necessary in FIG. 7 is to show the two connections essential to transfer between the two vessels. To show more would hamper a clear understanding of the concept advanced by FIG. 7.

In FIG. 7 conduit 54 is extended through the upper wall of vessel 50 and well down toward the bottom of bed 52. It is up this conduit 54 that a slurry-like mixture of media and liquid is forced and transferred to vessel 1.

When it is desired to return the bed of media from vessel 1 to vessel 50 the transport is through conduit 55. To bring about the transfer, the vessel containing the media to be transferred is agitated with liquid (water) and/or gas and the pressure built high enough, relative to the pressure in the receiving vessel, to force the transfer to take place through conduit 54 (vessel 50 to vessel 1) or through conduit 55 (vessel 1 to vessel 50).

In vessel 50, a perforated pipe 56 is mounted in the bottom and pump 57 is connected to a supply of liquid and/or gas to agitate bed 52. In vessel 1, the inlet for fluid to be processed at the bottom of the bed 1 has already been disclosed. Liquid and/or gas can be pumped into vessel 1 for the transfer agitation.

CONCLUSION

Structuring definitions of the various facets of the inventive concepts in the disclosure is difficult to couch is robust language within this particular art. As novel as the concepts are, they are embodied in structure and process which must be described in words such a vessel, horizontally and vertically extended, flow, fluids, bed media, distribution, backwash cycle, and drain. This is hardly a dramatic arsenal from which to select telling combinations that will ring with the solid advances this invention makes in the art. Therefore, if we do not have words with a persuasive bite to them, we can at least be sure we are not misunderstood as we trace the periphery of the scope of the present invention.

First, in language hopefully parallel to that used in the appended claims, review the first of the iventive concepts. Wherever cell 5 is disclosed as mounted to extend through a bed of media such as indicated by numeral 2 in FIGS. 1, 2 and 3, this cell is necessarily a chamber with holes in its sides to give them porosity to the liquids processed and flowing from the bed. Note the cell is intermediate the upper and lower faces of the bed and that the liquid-fluid to be processed is flowed to the cell from both faces of the bed. This is an important arrangement because the flow pattern from each end of the bed is a revolution in this art and it is a present discovery that cell 5 must extend over the horizontal cross-section of the bed between the upper and lower faces. The bed must be drained from the points at which the cell holes are located. Otherwise, the bed will not be uniformly contacted by the liquid-fluid during processing with consequent low efficiency.

Second, the basic vessel in which the bed of granular media is supported is brought into the definition to make it clear that it can have at least two forms and function under the inventive concepts. The vessel can be cylindrical and, as a cylinder, can have its axis extended vertically or horizontally. The bed of granular media is supported in the lower portion of the vessel, horizontal or vertical, so there will remain a volume above the bed into which the bed can be expanded in the backwash cycle. So located, in the unisex vessel, the bed has the drain structure (including cell 5) extending through the bed between its upper and lower faces.

To be sure there is no misunderstanding the invention as embodied in a horizontal vessel, the drawing discloses the use of partitions in the vessel to give a vertical profile to the bed compared to the profile of the bed in a vertical vessel.

In disclosing the partitions in the horizontal vessel a bonus arrangement emerged. The partitions formed, with the internal sides of the horizontal vessel, results in manifold conduits for liquids flowed into and from the horizontally elongated bed. The drain structure, centered about cell 5, remains in the form disclosed in the FIGS. 1, 2 and 3 of the drawings. Only now the cell is extended between the two parallel partitions running the length of the horizontal vessel shell.

Third, the inventive concept in the FIG. 6 disclosure is the little trick in the backwashing arrangement required by the particular location of the cell in the middle of the bed. The backwashing of the bed results in the expansion of the bed. As the bed expands it passes around the cell extended transverse the direction of expansion. The scrubbing of the bed media by the backwash liquid is all around the cell. Of course some of the dirt, or debris, finds its way into the cell chamber. When the normal flow pattern is taken up again all the collected material gets carried out with the processed fluid. FIG. 6 shows how the normal flow connections to the vessel can be modified to route this debris right back to the bed and prior to going back on stream with the bed. We come down to the essential element of this definition being connection-conduit 41, valved with valve 33. Defined as set forth in the specification describing FIG. 6, this conduit enables the collected debris in the cell to be swept back to the bed faces and thereby isolated from the outlet of the unit.

By the same tokens of language we can see that a conduit from the pump outlet in FIG. 6 places a back flushing pressured flow on the cell which sweeps its screens free of bed granules and therefore cleans it for use on the following service cycle.

Finally, we come to the storage-holding-transfer tank of FIG. 7. To provide a separate tank into which bed material can be flushed from the processing vessel appears simple. Implementing the system was not as simple as it appeared. Placement of the connecting conduit openings had to be discovered to make the transfer. The exit of the conduit had to be at the lower portion of the bed and the agitation had to be initiated near the exit. Therefore, the final arrangement of FIG. 7 was not obvious. It was a discovery which was necessary to bring about the transfer.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A fluid processing unit, including,
    a vessel in which fluid is processed by being passed through granular media;
    a bed of granular media mounted in the vessel so as to provide horizontal and parallel faces vertically spaced from each other through which fluid to be processed is passed into the bed for processing,
    inlet conduits mounted through the wall of the vessel and positioned relative to the upper and lower faces of the bed so as to direct fluid to be processed through each face at the same time;
    a source of fluid to be processed by the bed of granular media;
    a pump connected between the source and inlet connections to deliver fluid to be processed to the bed faces and through both bed faces and into the bed;
    a drain structure mounted in the vessel and intermediate the bed faces and within the bed and extending horizontally across the bed and comprising;
    an elongated chamber orientated to extend horizontally across the bed, and having a chamber thickness substantially smaller than its vertical width to thereby provide a relatively small profile to the vertical movement of the media bed within the vessel, said elongated chamber having spaced holes in its wall through which fluid processed by the bed is received into the chamber;
    an an outlet conduit connected to communicate to the chamber to remove the processed fluid from the vessel.

2. The unit of claim 1 including,
    a screen structure mounted over the holes formed through the wall of the chamber and having a mesh size which will prevent the granules of the bed from passing into the chamber with the processed fluid.

3. The unit of claim 1 in which the chamber comprises two plates,
    each of the plates is formed at its mid-width for spacing a finite distance apart and then converge toward each other with their upper and lower edges to join in forming the volume of the chamber.

4. The unit of claim 1, including,
    a connection between the outlet conduit and the inlet of the pump,
    a valve in the connection,
    and means to open the valve to circulate the processed fluid back to the pump.
    whereby, after the bed in backwashed and debris was collected in the chamber of the drain structure, the circulation of fluid back to the pump returns the debris to the bed.

5. The unit of claim 1, including,
    a connection between the outlet conduit and the outlet of the pump,
    a valve in the connection,
    and means to open the valve to increase the back pressure in the chamber of the drain structure,
    whereby, after backwash of the bed and return of the debris to the bed, bed media clogging the screen and holes will be removed.

* * * * *